(12) United States Patent
Zeng et al.

(10) Patent No.: US 9,374,130 B2
(45) Date of Patent: Jun. 21, 2016

(54) METHOD AND APPARATUS FOR TRIGGERING A RANKED TRANSMISSION

(75) Inventors: Erlin Zeng, Beijing (CN); Shuang Tan, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 17 days.

(21) Appl. No.: 14/237,691

(22) PCT Filed: Aug. 10, 2011

(86) PCT No.: PCT/CN2011/078206
§ 371 (c)(1),
(2), (4) Date: Mar. 20, 2014

(87) PCT Pub. No.: WO2013/020279
PCT Pub. Date: Feb. 14, 2013

(65) Prior Publication Data
US 2014/0192843 A1    Jul. 10, 2014

(51) Int. Cl.
*H04B 1/713* (2011.01)
*H04L 5/00* (2006.01)
*H04L 5/02* (2006.01)

(52) U.S. Cl.
CPC .............. *H04B 1/713* (2013.01); *H04L 5/0053* (2013.01); *H04L 5/02* (2013.01)

(58) Field of Classification Search
CPC ... H04L 5/0053; H04L 1/0026; H04L 1/0031; H04L 1/0027; H04W 72/042; H04W 72/0413; H04W 48/12
USPC .......................... 375/132, 135; 370/329, 335
See application file for complete search history.

(56) References Cited

U.S. PATENT DOCUMENTS

| | | | |
|---|---|---|---|
| 8,483,698 B2 * | 7/2013 | Papasakellariou et al. | 455/450 |
| 2002/0041622 A1 | 4/2002 | Steed et al. | |
| 2011/0110230 A1 | 5/2011 | Zhuang | |
| 2012/0170525 A1 * | 7/2012 | Sorrentino | 370/329 |

OTHER PUBLICATIONS

3GPP TS 36.213; V10.2.0 (Jun. 2011) Technical Specification Group Radio Access Network; Evolved Universal Terrestrial Radio Access (E-UTRA) Physical layer procedures (Release 10), Sec 8.6 Modulation order, redundancy version and transport block size determination, pp. 82-87.

* cited by examiner

*Primary Examiner* — Daniel Washburn
*Assistant Examiner* — Eboni Hughes
(74) *Attorney, Agent, or Firm* — Oblon, McClelland, Maier & Neustadt, L.L.P.

(57) ABSTRACT

A method and apparatus are provided for providing improved spectrum efficiency by triggering a ranked transmission. In this regard, a method is provided that includes causing a configuration message to be transmitted to a mobile terminal, wherein the configuration message provides interpretation information for a frequency hopping flag bit. The method also includes determining a rank for a transmission. The method may include setting a rank indication in the frequency hopping flag bit of a downlink control message based on the determined rank of the transmission.

20 Claims, 5 Drawing Sheets

METHOD AND APPARATUS FOR TRIGGERING A RANKED TRANSMISSION

TECHNOLOGICAL FIELD

Embodiments of the present invention relate generally to communications technology and, more particularly, to methods and apparatus for improving spectrum efficiency by triggering a ranked transmission.

BACKGROUND

There is increasing emphasis for wireless communication systems to provide higher data rates so as to allow for increased throughput. In this regard, Long-Term Evolution (LTE) and LTE-Advanced systems have been developed so as to provide enhanced services including higher data rates and reduced latency at lower cost.

In LTE environments various uplink methods are used, for example as is described in Section 8.6 of 3GPP specification TS 36.213, which is hereby incorporated by reference as if set forth in its entirety herein, an LTE uplink such as a Physical Uplink Shared Channel ("PUSCH") generally carries only Uplink Control Information (UCI) (i.e., no data). For example, when a mobile terminal detects that certain reserved Modulation and Coding Scheme (MCS) levels are indicated by an uplink (UL) grant and when the total number of assigned Physical Resource Blocks (PRBs) fulfills a certain requirement, the mobile terminal may utilize UCI-only PUSCH.

It has been shown that with configured component carriers (CCs) and a Channel State Information (CSI) feedback mode 3-1, a typical example of UCI feedback overhead would be 5 CC×68 bits/CC=340 bits. In LTE release 11, with the introduction of downlink ("DL") coordinated multiple point transmission/reception ("CoMP"), it is possible that one mobile terminal could be configured to report the UCI corresponding to a set of N cells/points. The worst case would be that the payload size will be increased to N*340 bits, with 5 configured CCs and N configured cells/points all requiring a UCI report. In this case, it is useful to allow 16-quadrature amplitude modulation ("QAM") and/or rank-2 transmissions for higher spectrum efficiency.

Existing proposals for modulation scheme and rank indication for UCI-only PUSCH fall short of achieving the desired higher spectrum efficiency. One example is modulation scheme indication using quadrature phase shift keying (QPSK) or 16 QAM. In this example, if UCI reporting is triggered by DCI format 0: (a) whether QPSK or 16 QAM is used can be implicitly indicated by the number of CCs that are configured for UCI report, e.g., 16 QAM is used when more than two CCs require UCI feedback; and (b) whether QPSK or 16 QAM is used can be explicitly indicated by a reserved MCS stage, e.g., I_{MCS}=31. In another example, if UCI reporting is triggered by DCI format 4: (a) whether QPSK or 16 QAM is used can be implicitly indicated by the number of CCs that are configured for UCI report; (b) whether QPSK or 16 QAM is used can be explicitly indicated by a reserved MCS stage, e.g., I_{MCS}=31; and/or (c) whether QPSK or 16 QAM is used can be explicitly indicated by the NDI field of a disabled TB=1. Another example is Rank indication, such as rank1 or rank 2. Assuming that for the case of rank 2, a single codeword (CW) is mapped to two layers; UCI reporting is triggered by downlink control information (DCI) format 4 and/or one of the two TBs is disabled; and/or PMI field indicates the rank 2 precoder.

BRIEF SUMMARY

A method and apparatus are therefore provided according to an example embodiment in order to provide improved spectrum efficiency by triggering a ranked transmission. In this regard, the method and apparatus of one embodiment may facilitate rank-1 or rank-2 messages in, for example, PUSCH transmissions by using DCI format 0. Such rank determinations may be indicated by reusing a frequency hopping flag bit in DCI format 0. By providing for the reuse of the frequency hopping flag bit, the system may require less control overhead without increasing the payload size for the uplink grant. Thus, the method and apparatus of one embodiment may facilitate more efficient utilization of the spectrum while providing for rank-2 transmissions.

In one embodiment, a method is provided that includes causing a configuration message to be transmitted to a mobile terminal, wherein the configuration message provides interpretation information for a frequency hopping flag bit. The method of this embodiment also includes determining a rank for a transmission. The method may include setting a rank indication in the frequency hopping flag bit of a downlink control message based on the determined rank of the transmission.

In another embodiment, an apparatus is provided that includes at least one processor and at least one memory including computer program code with the at least one memory and the computer program code configured to, with the at least one processor, cause the apparatus at least to cause a configuration message to be transmitted to a mobile terminal, wherein the configuration message provides interpretation information for a frequency hopping flag bit. The at least one memory and the computer program code are also configured in one embodiment to, with the at least one processor, cause the apparatus to determine a rank for a transmission from a mobile terminal. The at least one memory and the computer program code are also configured in one embodiment to, with the at least one processor, cause the apparatus to set a rank indication in the frequency hopping flag bit of a downlink control message based on the determined rank of the transmission.

In a further embodiment, a computer program product is provided that includes at least one non-transitory computer-readable storage medium having computer-readable program instructions stored therein with the computer-readable program instructions including program instructions configured to cause a configuration message to be transmitted to a mobile terminal, wherein the configuration message provides interpretation information for a frequency hopping flag bit. The computer-readable program instructions of this embodiment may also include program instructions configured to determine a rank for a transmission from a mobile terminal. The computer-readable program instructions of this embodiment may also include program instructions configured to set a rank indication in the frequency hopping flag bit of a downlink control message based on the determined rank of the transmission.

In yet another embodiment, an apparatus is provided that includes means for causing a configuration message to be transmitted to a mobile terminal, wherein the configuration message provides interpretation information for a frequency hopping flag bit. The apparatus may also include means for determining a rank for a transmission from a mobile terminal. The apparatus may also include means for setting a rank indication in the frequency hopping flag bit of a downlink control message based on the determined rank of the transmission.

In one embodiment, a method is provided that includes receiving a configuration message, wherein the configuration message provides interpretation information for a frequency hopping flag bit. The method of this embodiment may also include determining a rank indication using the frequency hopping flag bit of a downlink control message. Additionally, the method may include causing a transmission based on the determined rank indication.

In another embodiment, an apparatus is provided that includes at least one processor and at least one memory including computer program code with the at least one memory and the computer program code configured to, with the at least one processor, cause the apparatus at least to receive a configuration message, wherein the configuration message provides interpretation information for a frequency hopping flag bit. The at least one memory and the computer program code of one embodiment are also configured to, with the at least one processor, cause the apparatus to determine a rank indication using the frequency hopping flag bit of a downlink control message. Additionally, the at least one memory and the computer program code may be configured to, with the at least one processor, cause the apparatus to cause a transmission based on the determined rank indication.

In a further embodiment, a computer program product is provided that includes at least one non-transitory computer-readable storage medium having computer-readable program instructions stored therein with the computer-readable program instructions including program instructions configured to receive a configuration message, wherein the configuration message provides interpretation information for a frequency hopping flag bit. The computer-readable program instructions of this embodiment may also include program instructions configured to determine a rank indication using the frequency hopping flag bit of a downlink control message and program instructions configured to cause a transmission based using the determined rank indication.

In yet another embodiment, an apparatus is provided that includes means for receiving a configuration message, wherein the configuration message provides interpretation information for a frequency hopping flag bit. The apparatus of this embodiment may also include means for a rank indication using the frequency hopping flag bit of a downlink control message. Additionally, the apparatus may include means for causing a transmission based on the determined rank indication.

BRIEF DESCRIPTION OF THE SEVERAL VIEWS OF THE DRAWINGS

Having thus described the example embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following:
(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product are disclosed for providing improved spectrum efficiency by triggering a ranked transmission. As such, the method, apparatus and computer program product of one embodiment may facilitate rank-1 or rank-2 PUSCH transmissions. In an example embodiment, a rank indication provides the number of layers/streams of the transmission in MIMO systems. For example, rank 1 indicates that one data stream will be transmitted over air, and rank 2 indicates that two data streams are simultaneously transmitted by e.g. employing spatial multiplexing.

Further the method, apparatus and computer program provides information both to a mobile terminal and access point to ensure both sides understand the rank of a transmission. By way of example but not of limitation, a rank-2 UCI-only PUSCH transmission may be triggered using downlink control information ("DCI") format 0. In order to trigger the rank-2 UCI-only PUSCH transmission, a frequency hoping flag bit in DCI format 0 may be reused to indicate whether rank-1 or rank-2 is used for UCI-only PUSCH transmission. Alternatively or additionally, a rank-2 UCI-only PUSCH transmission is enabled in an instance where a mobile terminal determines that a UCI-only PUSCH transmission is triggered by DCI format 0 and the mobile terminal is configured (e.g., via radio resource control "RRC" signaling) such that a rank-2 UCI-only PUSCH transmission could be triggered by the frequency hopping flag. Alternatively or additionally, CSI-only, rank and/or ACK/NACK transmissions may be used.

Figure 1:
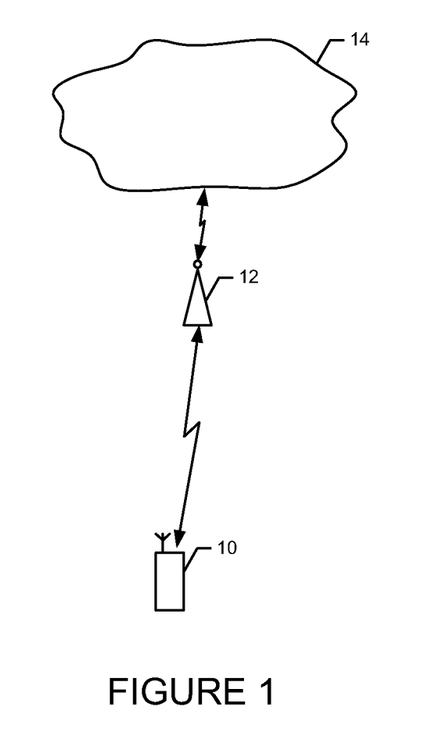
FIG. 1 is a schematic representation of a system in which an example embodiment of the present invention is operable.

Although the method, apparatus and computer program product may be implemented in a variety of different systems, one example of such a system is shown in FIG. 1, which includes a first communication device (e.g., mobile terminal 10) that is capable of communication via an access point 12, such as a base station, a Node B, an evolved Node B (eNB) or the like, with a network 14 (e.g., a core network). While the network may be configured in accordance with LTE or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more access points 12, each of which may serve a coverage area divided into one or more cells. The access point or other communication node could be, for example, part of one or more cellular or mobile networks or public land mobile networks (PLMNs). In turn, other devices such as processing devices (e.g., personal computers, server computers or the like) may be coupled to the mobile terminal and/or other communication devices via the network.

A communication device, such as the mobile terminal 10 (also known as user equipment (UE)), may be in communication with other communication devices or other devices via the access point 12 and, in turn, the network 14. In some cases, the communication device may include an antenna for transmitting signals to and for receiving signals from an access point, such as via a plurality of component carriers (CCs) including a primary cell (PCell) and one or more secondary cells (SCell) in one mode of operation.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal may also include communication circuitry and corresponding hardware/software to enable communication with other devices and/or the network 14.

Figure 2:
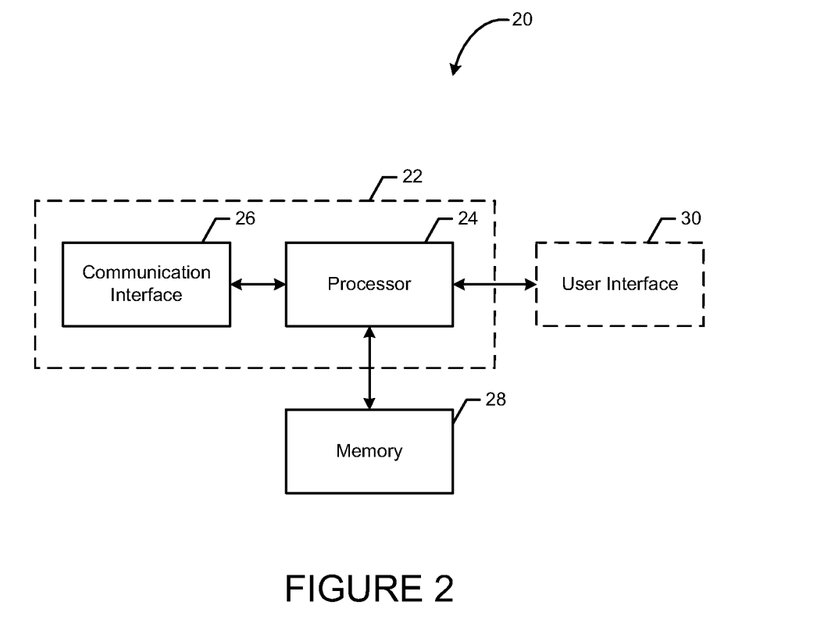
FIG. 2 is a block diagram of an apparatus that may be specifically configured to implement an example embodiment of the present invention.

In one embodiment, for example, the mobile terminal 10 and/or the access point 12 may be embodied as or otherwise include an apparatus 20 as generically represented by the block diagram of FIG. 2. While the apparatus may be employed, for example, by a mobile terminal or an access point, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 28 that may be in communication with or otherwise control a communications interface 26 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. The apparatus 20 need not always include a user interface. For example, in instances in which the apparatus is embodied as an access point 12, the apparatus may not include a user interface. As such, the user interface is shown in dashed lines in FIG. 2.

The communications interface 26 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 14 and/or any other device or module in communication with the processing circuitry 22, such as between the mobile terminal 10 and the access point 12. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (e.g., physically embodied in circuitry in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Figure 4:
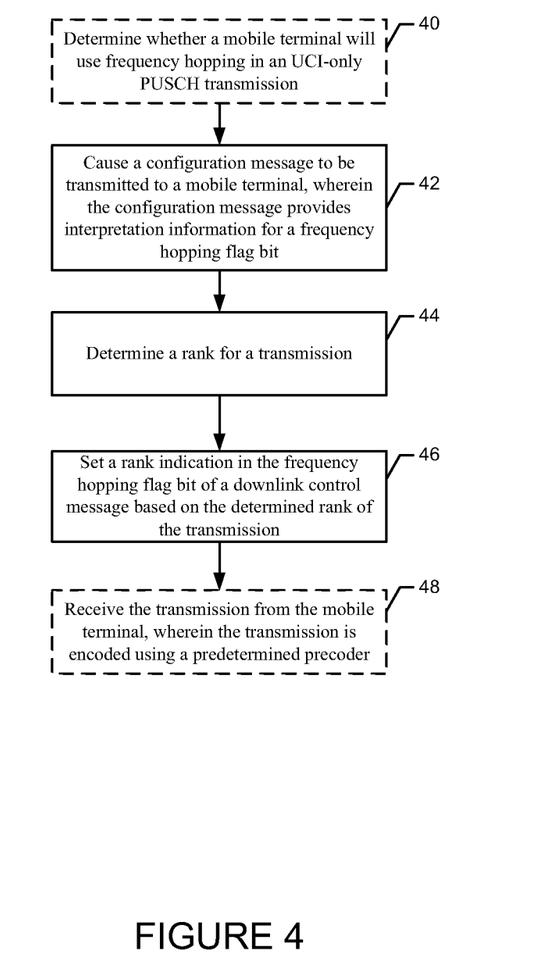
FIG. 4 is a flowchart illustrating the operations performed from the perspective of an access point in accordance with one embodiment of the present invention.
Figure 5:
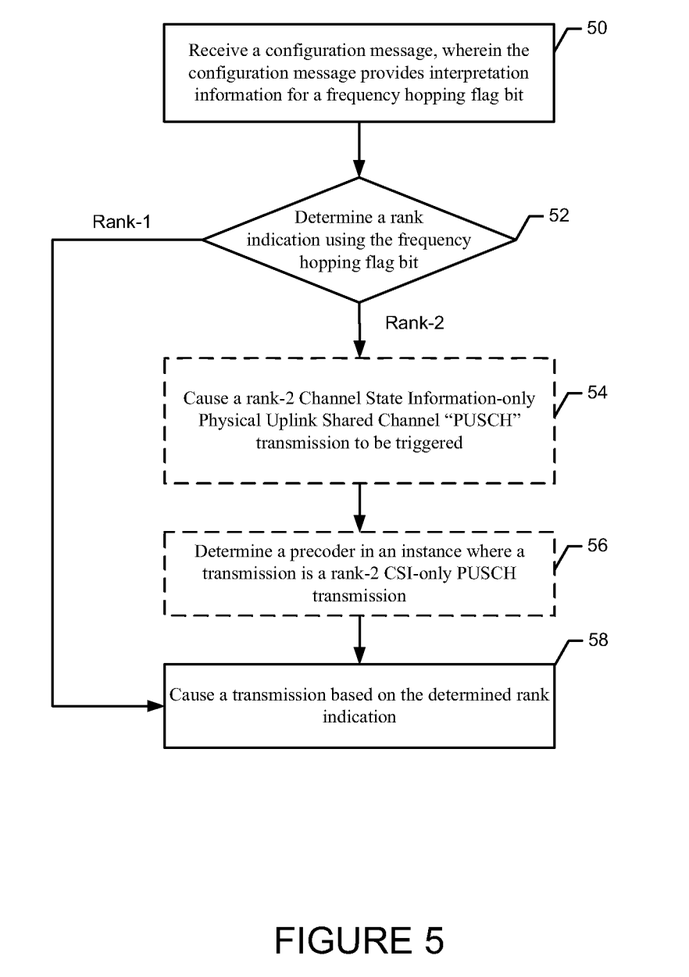
FIG. 5 is a flowchart illustrating the operations performed from the perspective of a mobile terminal in accordance with one embodiment of the present invention.

Referring now to FIGS. 4 and 5, flowcharts illustrating the operations performed by a method, apparatus and computer program product, such as apparatus 20 of FIG. 2, from the perspective of a mobile terminal 10 and an access point 12 in accordance with one embodiment of the present invention are illustrated. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 28 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4 and 5, when executed, convert a computer or processing circuitry into a particular machine configured to perform an example embodiment of the present invention. Accordingly, the operations of each of FIGS. 4 and 5 define an algorithm for configuring a computer or processing circuitry 22, e.g., processor, to perform an example embodiment. In some cases, a general purpose computer may be provided with an instance of the processor which performs the algorithm of a respective one of FIGS. 4 and 5 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

Although shown in the flowcharts in a somewhat abbreviated manners, certain ones of the operations above may be modified or further amplified as described below. Moreover, in some embodiments additional optional operations may also be included (some examples of which are shown in dashed lines in FIGS. 3-5). It should be appreciated that each of the modifications, optional additions or amplifications below may be included with the operations above either alone or in combination with any others among the features described herein.

Figure 3:
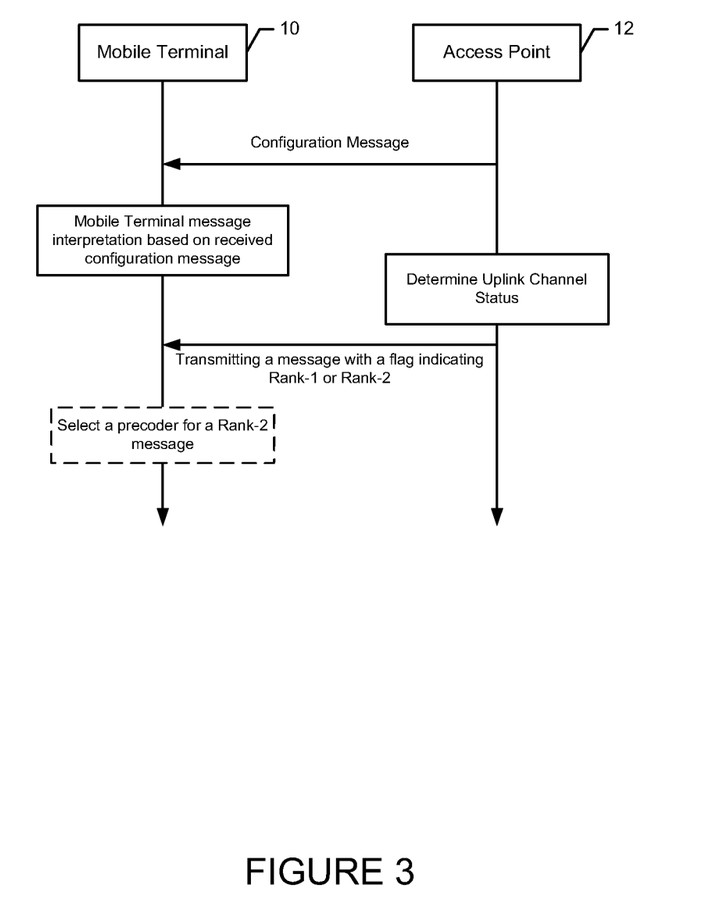
FIG. 3 is a signaling flow diagram illustrating the messages exchanged between an access point and a mobile terminal in accordance with one embodiment of the present invention.

In accordance with one embodiment of the present invention and as shown in FIG. 3, a mobile terminal 10 is provided that has the capability to receive a configuration message from an access point 12 that indicates how a downlink control message, such as DCI format 0 message will be interpreted. The mobile terminal 10, using an indication from the configuration message, is further configured to interpret the frequency hopping flag bit of the downlink control message. For example, the mobile terminal 10 may interpret the frequency hopping flag bit of the downlink control message as a rank indication. A rank indication may relate to message priority, resource levels and/or the like.

FIG. 4 is a flowchart illustrating the operations performed from the perspective of an access point 12 in accordance with one embodiment of the present invention. As shown in operation 40 of FIG. 4, for example, the access point 12 may include means, such as the processing circuitry 22, the processor 24 or the like, for receiving and for determining whether a mobile terminal 12 will use frequency hopping in a subsequent transmission, such as a UCI-only PUSCH transmission. For example, in some cases frequency hopping would be less useful and may therefore not be used when an access point 12 has relatively good CSI regarding a mobile terminal's 12 uplink channel, and when a mobile terminal 12 is connected with good uplink geometry. In the case where frequency hopping is not used and according to an example embodiment, it is possible to reuse the frequency hopping flag in the downlink control message, uplink grant. Alternatively or additionally the mobile terminal 10 may also be configured to determine if frequency hopping would be useful by the same or similar means as described above.

As shown in operation 42 of FIG. 4, for example, the access point 12 may include means, such as the processing circuitry 22, the processor 24, the communication interface 26 or the like, for causing a configuration message to be transmitted to a mobile terminal, wherein the configuration message provides interpretation information for a frequency hopping flag bit. The configuration may be semi-static, e.g., based on mobile terminal 10 specific radio resource control signaling. Alternatively or additionally the configuration may be stored in the memory 28 of the access point 12, and may be accessible by the mobile terminal 10 with such access causing the transmission of the configuration message.

As shown in operation 44 of FIG. 4, for example, the access point 12 may include means, such as the processing circuitry 22, the processor 24 or the like, for determining a rank for a transmission. For example, the access point 12 may determine the uplink channel status by configuring sounding reference signal transmissions from a mobile device 10. The access point 12 may then decide based on the knowledge of uplink channel status, whether rank-1 or rank-2 is to be used for the subsequent transmissions, such as for UCI-only PUSCH transmissions.

Further, as shown in operation 46 of FIG. 4, for example, the access point 12 may include means, such as the processing circuitry 22, the processor 24 or the like, for setting a rank indication in the frequency hopping flag bit of a downlink control message based on the determined rank of the transmission (e.g., the bit is set to "1" if rank-1 or set to "0" if rank-2 or vice versa).

At operation 48 for example, the access point 12 may include means, such as the processing circuitry 22, the communications interface 26 or the like, for receiving the transmission from the mobile terminal. The transmission may be encoded using a predetermined precoder. The precoder will be discussed in further detail with reference to operation 56 of FIG. 5.

FIG. 5 is a flowchart illustrating the operations performed from the perspective of a mobile terminal 10 in accordance with one embodiment of the present invention. As shown in operation 50 of FIG. 5, the apparatus 20 embodied by the mobile terminal 10 may include means, such as the processing circuitry 22, the processor 24, or the like, for receiving a configuration message, wherein the configuration message provides interpretation information for a frequency hopping flag bit. The configuration message is discussed in further detail with respect to operation 42 of FIG. 4. Alternatively or additionally the mobile terminal 10, using means such as the communication interface 26, may communicate and/or access the memory of the access point 12 to determine the configuration settings.

In the instance that the mobile terminal 10 receives interpretation information that indicates the mobile terminal 10 is to use the frequency hopping flag bit of a downlink control message, such as a DCI format 0 message, for triggering a transmission, such as a UCI-only PUSCH transmission, then as shown in operation 52 of FIG. 5, the apparatus 20 embodied by the mobile terminal 10 may include means, such as the processing circuitry 22, the processor 24, or the like, for determining a rank indication using the frequency hopping flag bit. In an instance where the frequency hopping flag bit indicates rank 2 then, as shown in operation 54 of FIG. 5, the apparatus 20 embodied by the mobile terminal 10 may include means, such as the processing circuitry 22, the communications interface 26, or the like, for causing a rank-2 transmission, such as a UCI-only PUSCH transmission, to be triggered.

As shown in operation 56 of FIG. 5, the apparatus 20 embodied by the mobile terminal 10 may include means, such as the processing circuitry 22, the processor 24, or the like, for determining a precoder in an instance where a transmission is a rank-2 UCI-only PUSCH transmission. For example, the mobile terminal 10 may select a rank-2 precoder P2 to precode the PUSCH as well as the de-modulation reference signal. The selection of P2, in an embodiment, may be predefined to ensure reasonable performance as well as testability. In example embodiments, multiple methods of selecting P2 may be used. One possible method of selecting P2 is to use the embodiment described in the 3GPP document "12.1-106207, UL SU-MIMO control signaling details, Nokia Siemens Networks, Nokia" which is hereby incorporated by reference as if set forth in its entirety herein, i.e., the precoder is used that is the same or similar to the precoder used in DCI format 4. By way of example, when mobile terminal 10 has two transmit antennas, the precoder may be a unit matrix, while when mobile terminal 10 has four transmit antennas, the precoder will be the same as in the latest previously received DCI format 4 which has a precoder matrix indication. Alternatively or additionally, the LTE specification defines different numbers of precoding matrices to be available for 2 antenna port and 4 antenna port configurations in the UL. In this regard, in a 2 Tx configuration with v representing the number of multiple-input and multiple-output "MIMO" layers, there are 6 precoding matrices for v=1 and 1 precoding matrix for v=2 with no precoding matrices being available for v>2. Additionally, in a 4 Tx configuration, there are 24 precoding matrices for v=1, 16 precoding matrices for v=2, 12 precoding matrices for v=3 and 1 precoding matrix for v=4. By switching to 4 Tx from 2 antenna ports, more flexibility in rank adaptation and for precoding matrix selection may be advantageously provided.

Alternatively or additionally, when the mobile terminal 10 has four transmit antennas, the four antennas are virtualized to two ports in an unspecified way, and a rank-2 unit matrix is used as P2. Alternatively or additionally, the precoder can be selected randomly or circularly from the set of candidates. For example, the index of the selected precoder can be a function of the subframe index in which UCI-only PUSCH is transmitted, or equally a function of the subframe index in which the uplink grant DCI format 0 is received.

In an example embodiment, the reuse of frequency hopping flag renders the frequency hopping for a transmission, such as a UCI-only PUSCH transmission, not applicable. For example, in current PUSCH design, there are two resource allocation types, i.e., i) resource allocation type 0, and ii) resource allocation type 1. For resource allocation type 0, the frequency hopping flag may be used as described herein and may be reused as rank indication.

However, for resource allocation type 1, since the frequency hopping flag bit is used as part of resource allocation, to reuse frequency hopping flag for rank indication would lead to certain scheduling restrictions. In this case, the apparatus and method, as described herein, may be configured such that the available resource allocation in DCI format 0 shall correspond to the Least Significant Bits (LSBs) of a combinatorial index as described with reference to 3GPP TS 36.213.

In the instance where the determined rank indication of operation 52 is rank-1 and in the instance of a rank-2 being precoded at operation 56, then as shown in operation 58 of FIG. 5, the apparatus 20 embodied by the mobile terminal 10 may include means, such as the processing circuitry 22, the processor 24, or the like, for causing a transmission based on the determined rank indication.

Advantageously or alternatively, the apparatus and method as described herein may be used in LTE Rel-11, where there will be higher UCI feedback overhead due to carrier aggregation and use of downlink COMP. The system and method advantageously uses less downlink control overhead in indicating rank-2 for UCI-only PUSCH, which is useful for spectrum efficiency improvement.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    causing, with circuitry, a configuration message to be transmitted to a mobile terminal, the configuration message including interpretation information that repurposes a frequency hopping flag bit as a rank indicator to indicate only rank-1 or rank-2 when the mobile terminal does not use frequency hopping when transmitting a transmission;
    determining, with the circuitry, a rank for the transmission; and
    using, by the circuitry, the repurposed frequency hopping flag bit of a downlink control message to indicate the determined rank for the transmission.

2. The method according to claim 1, wherein causing a configuration message to be transmitted includes providing trigger information for rank-2 Uplink Control Information-only Physical Uplink Shared Channel (PUSCH) transmission.

3. The method according to claim 1, further comprising initially determining whether the mobile terminal will use frequency hopping in an Uplink Control Information-only PUSCH transmission.

4. The method according to claim 1, wherein determining a rank includes determining a rank for the transmission based on an uplink channel status.

5. The method according to claim 1, further comprising receiving, with the circuitry, the transmission from the mobile terminal, the transmission being encoded using a predetermined precoder.

6. The method according to claim 1, wherein the determining of the rank for the transmission includes determining whether the transmission will use at least one of the rank-1 and the rank-2 for the Uplink Control Information-only PUSCH transmission.

7. The method according to claim 1, wherein the configuration is a downlink control information (DCI) format 0 message.

8. The method according to claim 5, wherein the predetermined precoder is used when the transmission is a rank-2 Uplink Control Information-only PUSCH transmission.

9. An apparatus comprising:
    circuitry configured to
    cause a configuration message to be transmitted to a mobile terminal, the configuration message including interpretation information that repurposes a frequency hopping bit as a rank indicator to indicate only rank-1 or rank-2 when the mobile terminal does not use frequency hopping when transmitting a transmission;
    determine a rank for the transmission from a mobile terminal; and
    use the repurposed frequency hopping bit of a downlink control message to indicate the determined rank for the transmission.

10. The apparatus according to claim 9, wherein the circuitry is further configured to provide trigger information for a rank-2 Uplink Control Information-only Physical Uplink Shared Channel (PUSCH) transmission.

11. The apparatus according to claim 9, wherein the circuitry is further configured to initially determine whether the mobile terminal will use frequency hopping in an Uplink Information-only PUSCH transmission.

12. The apparatus according to claim 9, wherein the circuitry is further configured to determine a rank for the transmission based on an uplink channel status.

13. The apparatus according to claim 9, wherein the circuitry is further configured to receive the transmission from the mobile terminal, the transmission being encoded using a predetermined precoder.

14. The apparatus according to claim 9, wherein the circuitry is further configured to determine whether the transmission will use at least one of the rank-1 and the rank-2 for the Uplink Control Information-only PUSCH transmission.

15. The apparatus according to claim 9, wherein the configuration message is a downlink control information (DCI) format 0 message.

16. An apparatus comprising:
    circuitry configured to
    receive a configuration message including interpretation information that repurposes a frequency hopping flag bit as a rank indicator to indicate only rank-1 or rank-2 when the apparatus does not use frequency hopping when transmitting a transmission;
    determine a rank indication using the repurposed frequency hopping flag bit of a downlink control message; and
    cause transmission of the transmission based on the determined rank indication.

17. The apparatus according to claim 16, wherein the circuitry is further configured to cause a rank-2 Uplink Control Information-only Physical Uplink Shared Channel (PUSCH) transmission to be triggered.

18. The apparatus according to claim 16, wherein the circuitry is further configured to determine a precoder when the transmission is a rank-2 Uplink Control Information-only PUSCH transmission.

19. The apparatus according to claim 16, wherein the circuitry is further configured to determine whether the transmission will use at least one of the rank-1 and the rank-2 for the Uplink Control Information-only PUSCH transmission.

20. The apparatus according to claim 16, wherein the configuration message is a downlink control information (DCI) format 0 message.

* * * * *